United States Patent
Lunin et al.

(10) Patent No.: US 9,157,517 B2
(45) Date of Patent: Oct. 13, 2015

(54) COMPOUND HARMONIC DRIVE

(71) Applicant: Hamilton Sundstrand Corporation, Windsor Locks, CT (US)

(72) Inventors: Stepan Lunin, Irvine, CA (US); Derick Balsiger, Mayer, AZ (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 148 days.

(21) Appl. No.: 14/027,788

(22) Filed: Sep. 16, 2013

(65) Prior Publication Data

US 2015/0075310 A1   Mar. 19, 2015

(51) Int. Cl.
*F16H 33/00* (2006.01)
*F16H 1/32* (2006.01)
*F16H 49/00* (2006.01)

(52) U.S. Cl.
CPC .................................. *F16H 49/001* (2013.01)

(58) Field of Classification Search
USPC .......................................................... 74/640
See application file for complete search history.

(56) References Cited

U.S. PATENT DOCUMENTS

| | | | |
|---|---|---|---|
| 2,906,143 A | 9/1959 | Musser | |
| 3,668,946 A | 6/1972 | Fahey et al. | |
| 4,601,216 A | 7/1986 | Inoue et al. | |
| 4,619,156 A | 10/1986 | Kiryu | |
| 5,123,300 A | 6/1992 | Himmelein et al. | |
| 5,775,178 A | 7/1998 | Asawa et al. | |
| 5,937,710 A * | 8/1999 | Gould et al. | 74/640 |
| 6,269,711 B1 * | 8/2001 | Tejima | 74/640 |
| 6,664,711 B2 | 12/2003 | Baudendistel | |
| 6,772,655 B2 | 8/2004 | Poehlau | |
| 7,409,891 B2 | 8/2008 | Takemura | |
| 7,421,990 B2 | 9/2008 | Taye et al. | |
| 7,453,176 B2 | 11/2008 | Davison | |
| 7,484,436 B2 | 2/2009 | Kiyosawa | |
| 7,527,130 B2 | 5/2009 | Baudendistel et al. | |
| 8,146,886 B2 | 4/2012 | Hanlon et al. | |
| 8,191,439 B2 | 6/2012 | Kobayashi et al. | |
| 8,485,064 B2 | 7/2013 | Kanai | |
| 2005/0288143 A1 * | 12/2005 | Menjak et al. | 475/29 |
| 2009/0320643 A1 | 12/2009 | Kanai | |
| 2011/0138952 A1 | 6/2011 | Ishikawa | |

OTHER PUBLICATIONS

"Harmonic Drive", from Wikipedia, <www.en.wikipedia.org/wiki/Harmonic_Drive> visited Jul. 30, 2012, 4 pages.

* cited by examiner

*Primary Examiner* — Ha D Ho
(74) *Attorney, Agent, or Firm* — Kinney & Lange, P.A.

(57) ABSTRACT

A harmonic drive includes a first flexible gear and a second flexible gear disposed around the first flexible gear and coaxial with the first flexible gear. A first ring gear meshes with the first flexible gear, and a second ring gear meshes with the second flexible gear.

15 Claims, 4 Drawing Sheets

COMPOUND HARMONIC DRIVE

BACKGROUND

This invention relates generally to gear systems, such as those suitable for use with geared actuators in aircraft.

Aircraft typically include flight control surfaces on aircraft wing structures that are moved and positioned in order to alter the lift characteristics of the wing structures. Actuators are coupled to the flight control surfaces and control and guide the movement of the flight control surfaces between positions. Generally, there are two types of actuators used in aircraft: linear actuators and rotary actuators. Conventionally, a rotary actuator uses an epicyclic-type reduction gear drive, commonly referred to as a planetary gear drive, to step down high speed rotation imputed by an electric drive motor. It is also common for a rotary actuator to use a planetary gear drive with multiple stages (multiple sets of planet gears) to increase the reduction ratio and torque-to-weight ratio of the planetary gear drive. While incorporating multiple stages into the planetary gear drive increases the reduction ratio and torque-to-weight ratio of the planetary gear drive, it also undesirably increases the size, weight, and complexity of the planetary gear drive.

Presently, the construction of aircraft wings is moving toward a thin-winged design, where the overall thickness of the wings is decreased from previous designs. Because the thickness of the wings is being decreased, it is becoming increasingly difficult to fit a conventional rotary actuator with a planetary gear drive within the cross-section of the wings, especially when the planetary gear drive incorporates multiple stages. The diameter of the planetary gear drive can be decreased in order to fit it within the reduced wing cross-section, however, the size of the teeth must also be decreased in order to maintain the high reduction ratio. Reducing the size of the teeth is undesirable because it lowers the torque-to-weight ratio of the planetary gear drive while also increasing the manufacturing tolerances and cost of the planetary gear drive.

SUMMARY

According to the present invention, a harmonic drive includes a first flexible gear and a second flexible gear disposed around the first flexible gear and coaxially with the first flexible gear. A first ring gear meshes with the first flexible gear, and a second ring gear meshes with the second flexible gear.

In another embodiment of the present invention, a method of assembling a harmonic drive includes positioning a wave generator radially within a first flexible gear. The first flexible gear has radially-outward-extending teeth. A second flexible gear is positioned around the first flexible gear such that the second flexible gear and the first flexible gear are coaxial. The second flexible gear includes radially-outward-extending teeth, an axial width smaller than an axial width of the first flexible gear, and radially-inward-extending teeth that mate with the radially-outward-extending teeth of the first flexible gear. A first ring gear is positioned around a portion of the first flexible gear such that radially-inward-extending teeth of the first ring gear mesh with the radially-outward-extending teeth of the first flexible gear. A second ring gear is positioned around the second flexible gear such that radially-inward-extending teeth of the second ring gear mesh with the radially-outward-extending teeth of the second flexible gear.

Figure 1:
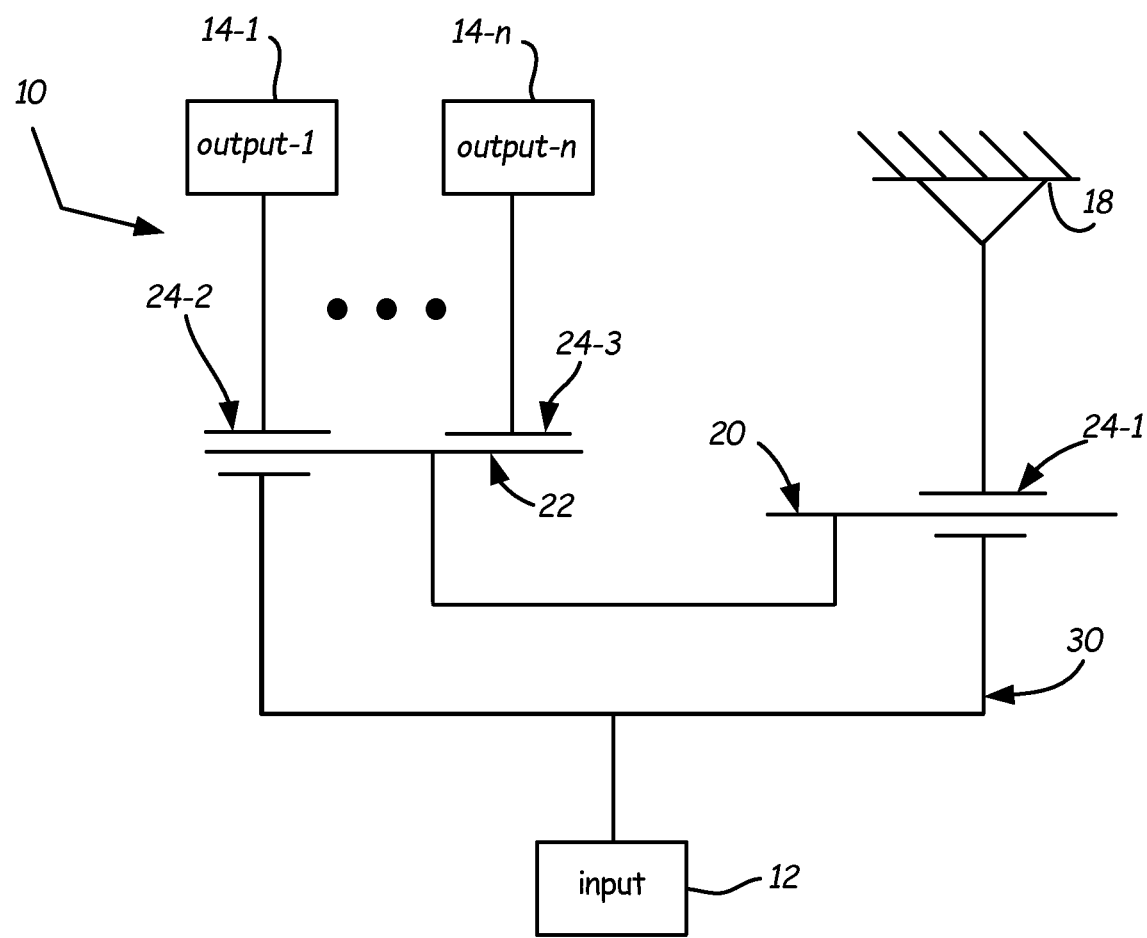
FIG. 1 is a schematic diagram of a harmonic drive assembly.

While the above-identified drawing figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In general, the present invention provides a harmonic drive assembly (also called a strain wave gear assembly) with a first flexible gear and a second flexible gear disposed around the first flexible gear. A first ring gear meshes with the first flexible gear and a second ring gear meshes with the second flexible gear. A wave generator can rotate both the first flexible gear and the second flexible gear, with the first flexible gear and the second flexible gear rotating at the same rate. The wave generator can be connected to a rotational input, such as an electric drive motor, etc. One of the ring gears can be connected to ground while the other ring gear can be connected to an output structure. The first flexible gear and the second flexible gear work together along with the ring gears as a compact compounded gear drive to step down the rotational input. The harmonic drive assembly is relatively simple and compact, yet maintains a relatively high gear ratio and relatively high torque-to-weight ratio.

FIG. 1 is a schematic diagram of harmonic drive assembly 10. As shown in FIG. 1, input 12, first output 14-1, and ground 18 are connected to harmonic drive assembly 10. In addition, more than one output can come out of harmonic drive assembly 10, as represented by additional output 14-$n$ (where n is a positive integer greater than or equal to 2 representing the number of additional outputs). Harmonic drive assembly 10 also includes first flexible gear 20, second flexible gear 22, first ring gear 24-1, second ring gear 24-2, third ring gear 24-3, and wave generator 30. Harmonic drive assembly 10 can further include other components and features not specifically shown or discussed.

Second flexible gear 22 is larger in diameter than first flexible gear 20, and is coaxial with first flexible gear 20. First flexible gear 20 and second flexible gear 22 are connected or integrated such that first flexible gear 20 and second flexible gear 22 rotate together at the same rate and do not rotate relative each other. Wave generator 30 is disposed radially within first flexible gear 20 and second flexible gear 22 and engages both first flexible gear 20 and second flexible gear 22. Wave generator 30 typically includes an elliptical or otherwise noncircular plug, and typically lacks teeth. Wave generator 30 is connected to input 12. Input 12 can be an output shaft of an electric drive motor, a hydraulic rotary drive, or other suitable torque source, and rotates wave generator 30. As input 12 rotates wave generator 30, wave generator 30 causes both first flexible gear 20 and second flexible gear 22 to rotate in the opposite direction from wave generator 30. Because first flexible gear 20 and second flexible gear 22 do not rotate relative to each other, wave generator 30 rotates both first flexible gear 20 and second flexible gear 22 at the same rate.

First ring gear 24-1 is positioned around (i.e., radially outward from and surrounding) a portion of first flexible gear 20 and meshes with first flexible gear 20. Second ring gear 24-2 is positioned around second flexible gear 22 and meshes with second flexible gear 22. As discussed in more detail below, first ring gear 24-1 includes a different number of internal teeth than second ring gear 24-2, such that first ring gear 24-1 and second ring gear 24-2 can rotate at different rates when wave generator 30 rotates first flexible gear 20 and second flexible gear 22. As shown in FIG. 1, first ring gear 24-1 can be connected to ground 18, which is rotationally fixed relative to a mounting location of harmonic drive assembly 10. Ground 18 can be a base plate fixed within the cross-section of a wing structure. By connecting first ring gear 24-1 to ground 18, first flexible gear 20 rotates within first ring gear 24-1 while first ring gear 24-1 remains fixed and does not rotate. When first ring gear 24-1 is connected to ground, second ring gear 24-2 will rotate first output 14-1 at a rate that is equal to a differential rate between first ring gear 24-1 and second ring gear 24-2. Third ring gear 24-3 can be disposed around and mesh with either first flexible gear 20 or second flexible gear 22. As shown in the embodiment of FIG. 1, third ring gear 24-3 meshes with second flexible gear 22. Third ring gear 24-3, and additional ring gears, can be added to harmonic drive assembly 10 to provide for additional outputs 14-n powered by harmonic drive assembly 10. Third ring gear 24-3 can include a different number of internal teeth from both first ring gear 24-1 and second ring gear 24-2, or it can include the same number of internal teeth as second ring gear 24-2 to create a common but bifurcated output.

The following is a step-by-step description of how harmonic drive assembly 10 steps down input 12 to output 14-1. Input 12 rotates wave generator 30 at a first rate in a first direction. Wave generator 30 rotates first flexible gear 20 inside first ring gear 24-1 at a second rate that is slower than the first rate, and in a second direction opposite to the first direction. For example, if first flexible gear 20 has x teeth, and first ring gear 24-1 has x+1 teeth meshing with the x teeth of first flexible gear 20, then first flexible gear will rotate at 1/x the rate in the opposite direction as the rate of input 12 and wave generator 30. Second flexible gear 22 rotates in the same direction (second direction) and at the same rate (second rate) as first flexible gear 20. However, second flexible gear 22 can have more teeth than first flexible gear 20 and/or second ring gear 24-2 can have more teeth than first ring gear 24-1. Because second flexible gear 22 and/or second ring gear 24-2 have a different number of teeth than first flexible gear 20 and first ring gear 24-1, and because first ring gear 24-1 is connected to ground 18, second ring gear 24-2 rotates around second flexible gear 22 in the first direction at a third rate that is slower than the second rate. Expanding on the previous example, if second flexible gear 22 has y teeth, and second ring gear 24-2 has y+1 teeth, second ring gear 24-2 will rotate in the first direction at approximately 1/y the rate of the second rate, and approximately 1/(y*x) the rate of the first rate, the first rate being the rate at which input 12 and wave generator 30 rotates. Second ring gear 24-2 is connected to first output 14-1, thus harmonic drive assembly 10, in the example above, rotates first output 14-1 at approximately 1/(y*x) the rate of input 12. In addition to stepping down the rate of rotation of input 12, harmonic drive assembly 10 approximately steps up the torque from input 12 in an inverse relationship to the step down in rate. Thus, in the above example, harmonic drive assembly 10 steps up the torque of input 12 such that first output 14-1 delivers approximately (y*x) more torque than input 12, albeit at a rate approximately (y*x) smaller. Similar to second ring gear 24-2 and first output 14-1, more ring gears, such as third ring gear 24-3, can be meshed to second flexible gear 22 or first flexible gear 20 to produce one or more additional outputs 14-n, if needed, that rotate at rates different from first output 14-1. Because harmonic drive assembly 10 provides such a high step-down ratio while delivering high torque, harmonic drive assembly 10 is able to convert a high speed input provided by an electric motor to a more useful and manageable output speed and torque. As discussed below, harmonic drive assembly 10 can also be simple, small, and compact.

Figure 2:
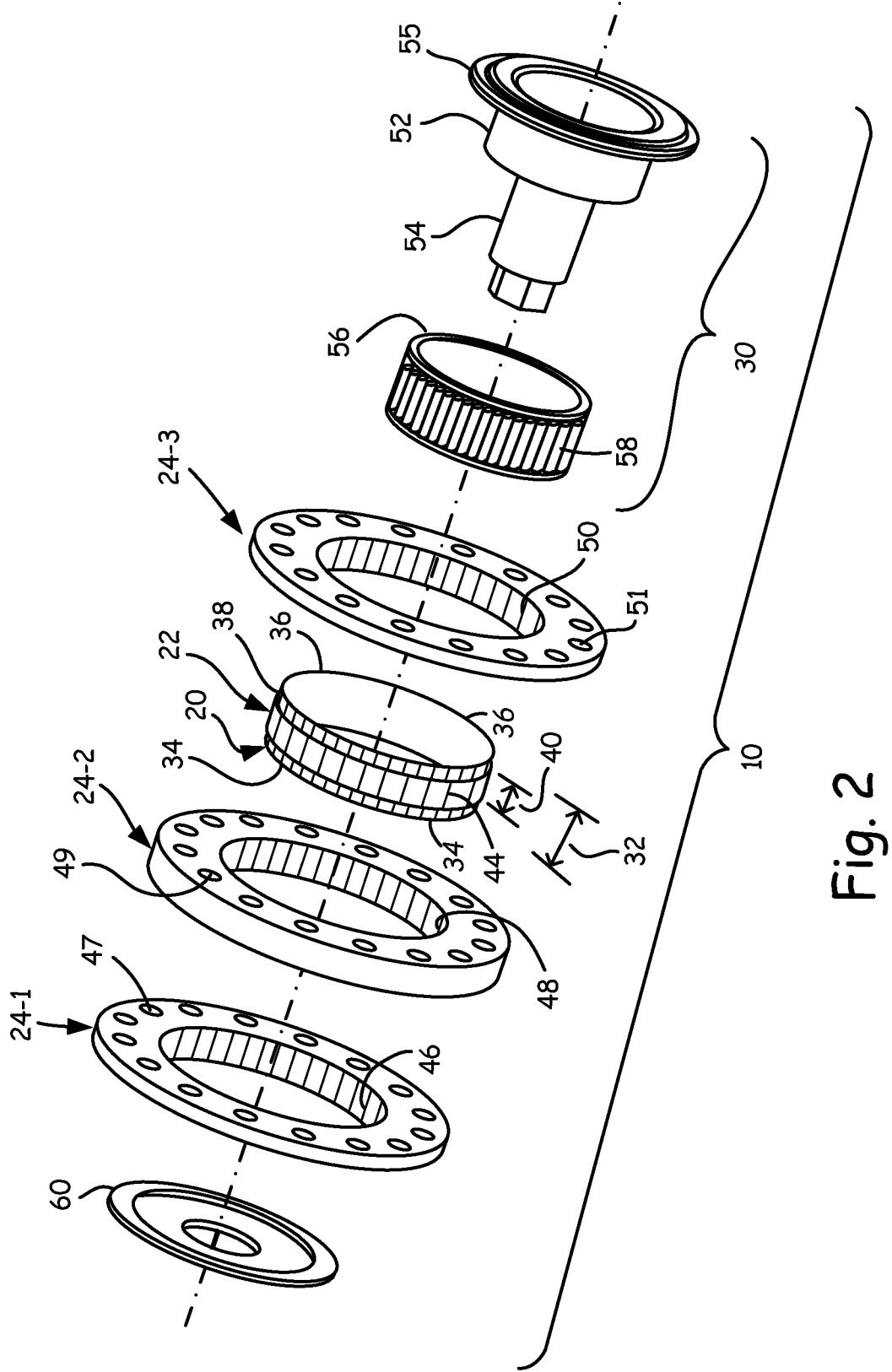
FIG. 2 is an exploded view of another embodiment of the harmonic drive assembly.
Figure 3:
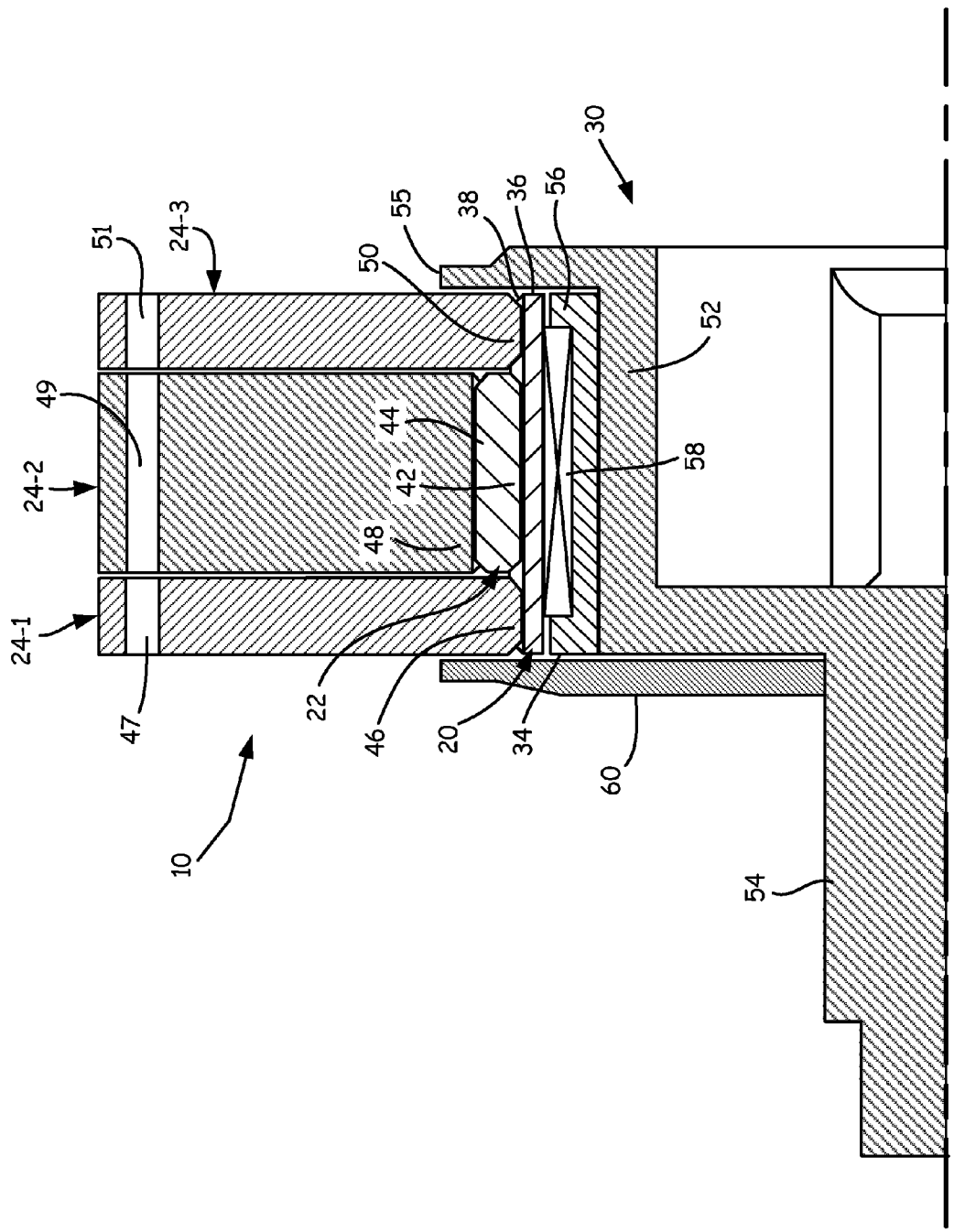
FIG. 3 is a cross-sectional view of the harmonic drive assembly from FIG. 2.

FIGS. 2-3 will now be discussed concurrently. FIG. 2 is an exploded view of another embodiment of harmonic drive assembly 10. FIG. 3 is a cross-sectional view of the embodiment of harmonic drive assembly 10 from FIG. 2. In addition to the elements previously described in FIG. 1, first flexible gear 20 can include axial width 32, first side 34, second side 36, and radially-outward-extending teeth 38. Second flexible gear can include axial width 40, radially-inward-extending teeth 42, and radially-outward-extending teeth 44. First ring gear 24-1 includes radially-inward-extending teeth 46 and holes 47. Second ring gear 24-2 includes radially-inward-extending teeth 48 and holes 49. Third ring gear 24-3 includes radially-inward-extending teeth 50 and holes 51. Wave generator 30 includes elliptical plug 52, shaft 54, rim 55, bearing race 56, bearings 58, and cap 60. A detailed discussion on the assembly of harmonic drive assembly 10 and the other above mentioned elements is now provided below.

First flexible gear 20 extends axially between first side 34 and second side 36, thereby defining axial width 32. Radially-outward-extending teeth 38 are formed on first flexible gear 20 and extend axially between first side 34 and second side 36 of first flexible gear 20. Second flexible gear 22 is positioned around first flexible gear 20 such that second flexible gear 22 and first flexible gear 20 are both coaxial and concentric. Radially-inward-extending teeth 42 of second flexible gear 22 (shown in FIG. 3) extend radially inward from second flexible gear 22 to mate with radially-outward-extending teeth 38 of first flexible gear 20. Radially-inward-extending teeth 42 of second flexible gear 22 mate with radially-outward-extending teeth 38 of first flexible gear 20 such that second flexible gear 22 is rotationally fixed (i.e., does not rotate) relative first flexible gear 20. Axial width 32 of first flexible gear 20 is wider than axial width 40 of second flexible gear 22, such that second flexible gear 22 does not completely cover first flexible gear 20. Second flexible gear 22 can be centered axially on first flexible gear 20 between first side 34 and second side 36 of first flexible gear 20 such that portions of first flexible gear 20 are exposed on both sides of second flexible gear 22. Because second flexible gear 22 is larger in diameter than first flexible gear 20, second flexible gear 22 can include a different number of radially-outward-extending teeth 44 than first flexible gear 20. Both first flexible gear 20 and second flexible gear 22 are made from relatively thin sheets of spring steel, or any other material with properties similar to spring steel. Because first flexible gear 20 and second flexible gear 22 can be made from spring steel, first flexible gear 20 and second flexible gear 22 are relatively thin, flexible, and elastic. By being made from relatively thin spring steel, or similar material, first flexible gear 20 and second flexible gear 22 also allow harmonic drive assembly 10 to comprise a total overall diameter smaller than the total diameter of a prior art planetary drive assembly with comparable reduction ratio and torque-to-weight ratio. First flexible gear 20 and second flexible gear 22 can be open on both sides, similar to hoops. Because first flexible gear 20 and second flexible gear 22 are open on both sides, flexible gear 20 and second flexible gear 22 elastically deform more uniformly than a conventional flexible gear that has one open side and one closed side. Increasing the uniformity in the elastic deformation of first flexible gear 20 and second flexible gear 22 increases their torque load capacity. As described below, elliptical plug 52 of wave generator 30 elastically deforms first flexible gear 20 and second flexible gear 22.

Elliptical plug 52 has an elliptical cross-section and is disposed radially within first flexible gear 20 and second flexible gear 22. Bearing race 56 is disposed around elliptical plug 52 and has an elliptical cross-section that corresponds with that of elliptical plug 52. First flexible gear 20 and second flexible gear 22 are disposed around elliptical plug 52 and bearing race 56. Bearings 58 are disposed between bearing race 56 and first flexible gear 20. Bearings 58 can be roller bearings. Bearings 58 allow first flexible gear 20 and second flexible gear 22 to rotate relative wave generator 30. When plug 52, bearing race 56, and bearings 58 of wave generator 30 are assembled within first flexible gear 20 and second flexible gear 22, wave generator 30 can contact and engage an inside surface of first flexible gear 20 at two diametrically opposed points, causing first flexible gear 20 and second flexible gear 22 to flex into an elliptical circumference around wave generator 30. Shaft 54 extends axially from plug 52 and is used to connect harmonic drive assembly 10 to input 12 described above in reference to FIG. 1. Rim 55 is formed on an opposite end of elliptical plug 52 opposite shaft 54 and helps, along with cap 60, to retain first flexible gear 20, second flexible gear 22, first ring gear 24-1, second ring gear 24-2, and third ring gear 24-3 around elliptical plug 52 of wave generator 30.

First ring gear 24-1 is circular and disposed around a portion of first flexible gear 20 between second flexible gear 22 and first side 34 of first flexible gear 20. Radially-inward-extending teeth 46 extend radially inward from first ring gear 24-1 and mesh with radially-outward extending teeth 38 of first flexible gear 20. Because wave generator 30 bends first flexible gear 20 into an elliptical shape, only two diametrically-opposed points of first flexible gear 20 mesh with first ring gear 24-1. Second ring gear 24-2 is circular and disposed around second flexible gear 22, and radially-inward-extending teeth 48 extend radially inward from second ring gear 24-2 and mesh with radially-outward-extending teeth 44 of second flexible gear 22. Because wave generator 30 bends second flexible gear 22 into an elliptical shape, only two diametrically-opposed points of second flexible gear 22 mesh with second ring gear 24-2. As discussed above in reference to FIG. 1, radially-inward-extending teeth 48 of second ring gear 24-2 differ in number from radially-inward-extending teeth 46 of first ring gear 24-1. As shown in FIGS. 2 and 3, third ring gear 24-3 is disposed around another portion of first flexible gear 20 between second flexible gear 22 and second side 36 of first flexible gear 20. Radially-inward-extending teeth 50 extend inward radially from third ring gear 24-3 and mesh with radially-outward-extending teeth 38 of first flexible gear 20. Third ring gear 24-3 can include the same number of radially-inward-extending teeth 50 as first ring gear 24-1, or it can include a different number of radially-inward-extending teeth 50 as first ring gear 24-1. Once first flexible gear 20, second flexible gear 22, first ring gear 24-1, second ring gear 24-2, and third ring gear 24-3 are assembled around elliptical plug 52 of wave generator 30, cap 60 is fixed around shaft 54 proximate elliptical plug 52, thereby retaining first flexible gear 20, second flexible gear 22, first ring gear 24-1, second ring gear 24-2, and third ring gear 24-3 between cap 60 and rim 55. Holes 47 extend axially through first ring gear 24-1, holes 49 extend axially through second ring gear 24-2, and holes 51 extend axially through third ring gear 24-3. Holes 47, 49, and 51 are used to connect first ring gear 24-1, second ring gear 24-2, and third ring gear 24-3 to first output 14-1, to another output 14-n, or to ground 18, depending on the desired configuration of harmonic drive assembly 10.

Figure 4:
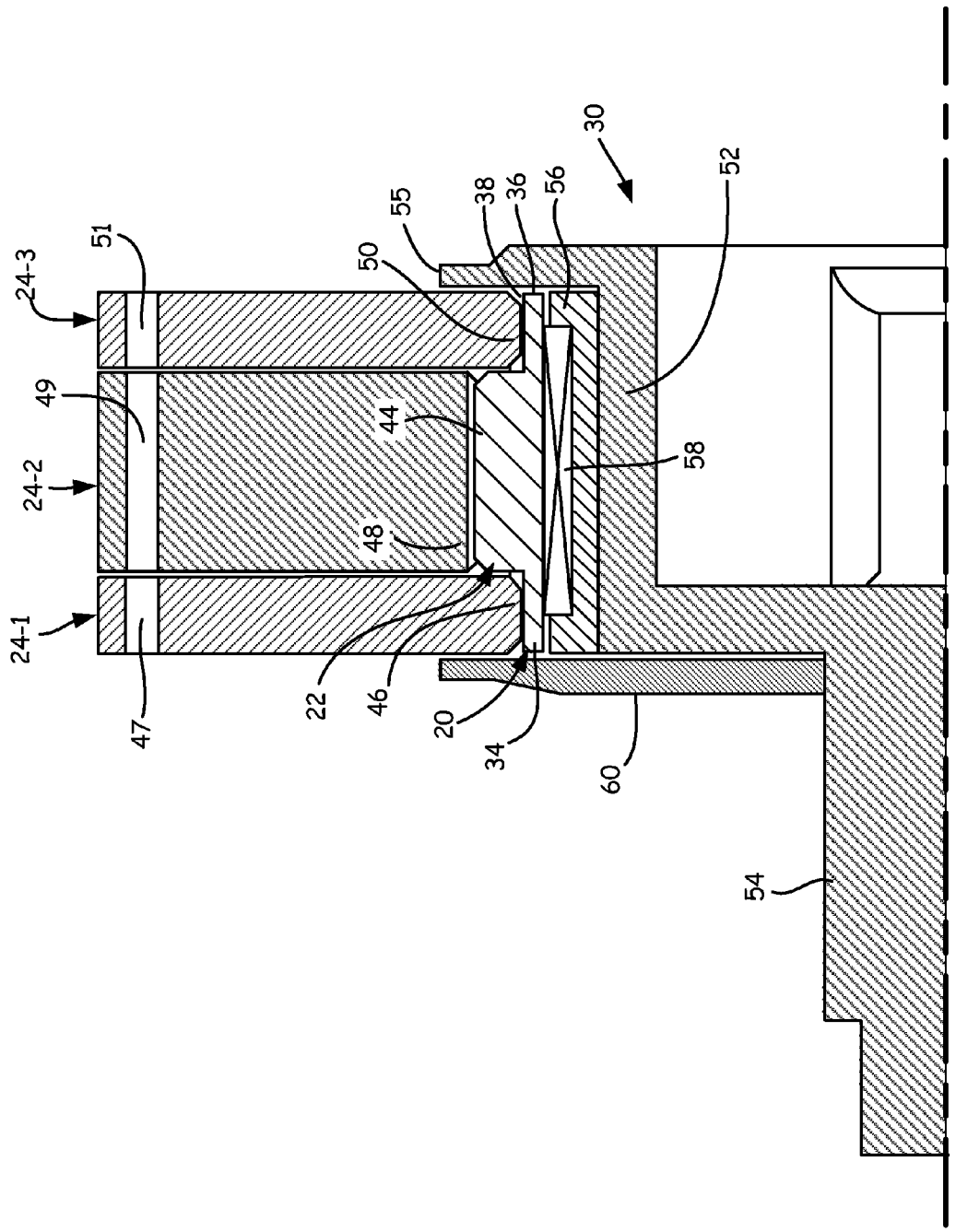
FIG. 4 is a cross-sectional view of another embodiment of the harmonic drive assembly.

FIG. 4 is a cross-sectional view of another embodiment of harmonic drive assembly 10'. As shown in FIG. 4, first flexible gear 20' and second flexible gear 22' are integral and formed from a single piece of spring steel. Radially-outward-extending teeth 44 of second flexible gear 22' are formed on the single piece of spring steel such that they extend radially outward further than radially-outward-extending teeth 38 of first flexible gear 20'. Making first flexible gear 20' and second flexible gear 22' integral further decreases the complexity of harmonic drive assembly 10' by reducing the over number of parts in harmonic drive assembly 10'.

In view of the foregoing description, it will be recognized that the present disclosure provides numerous advantages and benefits. For example, the present disclosure provides harmonic drive assembly 10 with first flexible gear 20, second flexible gear 22 disposed around first flexible gear 20, first ring gear 24-1 meshing with first flexible gear, second ring gear 24-2 meshing with second flexible gear 22, and wave generator 30 that rotates both first flexible gear 20 and second flexible gear 22. First flexible gear 20, second flexible gear 22, first ring gear 24-1, and second ring gear 24-2 produce within harmonic drive assembly 10 a high reduction ratio and high torque-to-weight ratio such that harmonic drive assembly 10 is able to step-down the rotational rate of input 12 while increasing the torque of input 12 as it enters harmonic drive assembly 10 through wave generator 30 and exits out through first output 14-1 or another output 14-n. Harmonic drive assembly 10 is also smaller in diameter than a conventional planetary gear drive with a reduction ratio and torque-to-weight ratio similar to harmonic drive assembly 10.

Discussion of Possible Embodiments

The following are non-exclusive descriptions of possible embodiments of the present invention.

In one embodiment, a harmonic drive includes a first flexible gear and a second flexible gear disposed around the first flexible gear and coaxially with the first flexible gear. A first ring gear meshes with the first flexible gear, and a second ring gear meshes with the second flexible gear.

The harmonic drive of the preceding paragraph can optionally include, additionally and/or alternatively, any one or more of the following features, configurations and/or additional components:

wherein the first flexible gear is axially wider than the second flexible gear;

wherein the second flexible gear is concentric with the first flexible gear, and the second flexible gear includes radially-inward-extending teeth that mate with radially-outward-extending teeth of the first flexible gear such that the second flexible gear does not rotate relative the first flexible gear;

wherein the first ring gear is disposed around a portion of the first flexible gear and includes radially-inward-extending teeth that mesh with the radially-outward extending teeth of the first flexible gear;

wherein the second ring gear is disposed around the second flexible gear and includes radially-inward-extending teeth that mesh with radially-outward-extending teeth of the second flexible gear;

wherein the second flexible gear includes a different number of radially-outward-extending teeth than the first flexible gear;

wherein the second ring gear includes a different number of radially-inward-extending teeth than the first ring gear;

wherein a third ring gear is disposed around another portion of the first flexible gear and includes radially-inward-extending teeth that mesh with the radially-outward-extending teeth of the first flexible gear;

wherein the third ring gear includes the same number of radially-inward-extending teeth as the first ring gear;

wherein a wave generator is disposed radially within the first flexible gear and the second flexible gear and engages with both the first and second flexible gears, the wave generator including a plug with an elliptical cross-section, a shaft extending from the plug, a bearing race disposed around the plug, and bearings disposed between the bearing race and second flexible gear. The wave generator rotates both the first flexible gear and the second flexible gear as the wave generator rotates;

wherein the wave generator rotates both the first flexible gear and the second flexible gear at the same rate;

wherein the first flexible gear and the second flexible gear are integral; and/or wherein the first ring gear or the second ring gear is grounded.

In another embodiment, a method of assembling a harmonic drive includes positioning a wave generator radially within a first flexible gear. The first flexible gear has radially-outward-extending teeth. A second flexible gear is positioned around the first flexible gear such that the second flexible gear and the first flexible gear are coaxial. The second flexible gear includes radially-outward-extending teeth, an axial width smaller than an axial width of the first flexible gear, and radially-inward-extending teeth that mate with the radially-outward-extending teeth of the first flexible gear. A first ring gear is positioned around a portion of the first flexible gear such that radially-inward-extending teeth of the first ring gear mesh with the radially-outward-extending teeth of the first flexible gear. A second ring gear is positioned around the second flexible gear such that radially-inward-extending teeth of the second ring gear mesh with the radially-outward-extending teeth of the second flexible gear.

The method of the preceding paragraph can optionally include, additionally and/or alternatively, any one or more of the following features, configurations and/or additional components:

wherein the first ring gear is connected to ground and the second ring gear is connected to an output structure.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal or rotational operational conditions, and the like.

While the invention has been described with reference to an exemplary embodiment(s), it will be understood by those skilled in the art that various changes may be made and equivalents may be substituted for elements thereof without departing from the scope of the invention. For example, while the specification describes second flexible gear 22 and first ring gear 24-1 being disposed around first flexible gear 20 while second ring gear 24-2 is disposed around second flexible gear 22, in an alternative embodiment second flexible gear 22 and first ring gear 24-1 can be disposed within first flexible gear 20, and second ring gear 24-2 can be disposed within second flexible gear 22. In the alternative embodiment, wave generator 30 would be disposed around first flexible gear 20. First flexible gear 20 would have radially-inward-extending teeth that would mesh with radially-outward-extending teeth on first ring gear 24-1, and second flexible gear 22 would have radially-inward-extending teeth that would mesh with radially-outward-extending teeth on second ring gear 24-2. In addition, many modifications may be made to adapt a particular situation or material to the teachings of the invention without departing from the essential scope thereof. For example, while the invention has been described as being applied in the wing structures of an aircraft, the invention may be used in other areas of an aircraft, such as in the landing gear, doors, or even in the gas turbine engine. Therefore, it is intended that the invention not be limited to the particular embodiment(s) disclosed, but that the invention will include all embodiments falling within the scope of the appended claims.

The invention claimed is:

1. A harmonic drive comprising:
   a first flexible gear;
   a second flexible gear disposed around the first flexible gear and coaxially with the first flexible gear;
   a first ring gear that meshes with the first flexible gear; and
   a second ring gear that meshes with the second flexible gear.

2. The harmonic drive of claim 1, wherein the first flexible gear is axially wider than the second flexible gear.

3. The harmonic drive of claim 2, wherein the second flexible gear is concentric with the first flexible gear, and the second flexible gear includes radially-inward-extending teeth that mate with radially-outward-extending teeth of the first flexible gear such that the second flexible gear does not rotate relative the first flexible gear.

4. The harmonic drive of claim 3, wherein the first ring gear is disposed around a portion of the first flexible gear and includes radially-inward-extending teeth that mesh with the radially-outward extending teeth of the first flexible gear.

5. The harmonic drive of claim 4, wherein the second ring gear is disposed around the second flexible gear and includes radially-inward-extending teeth that mesh with radially-outward-extending teeth of the second flexible gear.

6. The harmonic drive of claim 5, wherein the second flexible gear includes a different number of radially-outward-extending teeth than the first flexible gear.

7. The harmonic drive of claim 5, wherein the second ring gear includes a different number of radially-inward-extending teeth than the first ring gear.

8. The harmonic drive of claim 5 further comprising:
   a third ring gear disposed around another portion of the first flexible gear and includes radially-inward-extending teeth that mesh with the radially-outward-extending teeth of the first flexible gear.

9. The harmonic drive of claim 8, wherein the third ring gear includes the same number of radially-inward-extending teeth as the first ring gear.

10. The harmonic drive of claim 5 further comprising:
    a wave generator disposed radially within the first flexible gear and the second flexible gear and engaged with both the first and second flexible gears, the wave generator comprising:
    a plug with an elliptical cross-section;

a shaft extending from the plug;

a bearing race disposed around the plug; and bearings disposed between the bearing race and the first flexible gear; and wherein the wave generator rotates both the first flexible gear and the second flexible gear as the wave generator rotates.

11. The harmonic drive of claim 1, wherein the wave generator rotates both the first flexible gear and the second flexible gear at the same rate.

12. The harmonic drive of claim 1, wherein the first flexible gear and the second flexible gear are integral.

13. The harmonic drive of claim 1, wherein the first ring gear or the second ring gear is grounded.

14. A method of assembling a harmonic drive, the method comprising:

positioning a wave generator radially within a first flexible gear, the first flexible gear comprising radially-outward-extending teeth;

positioning a second flexible gear around the first flexible gear such that the second flexible gear and the first flexible gear are coaxial, the second flexible gear comprising radially-outward-extending teeth, an axial width smaller than an axial width of the first flexible gear, and radially-inward-extending teeth that mate with the radially-outward-extending teeth of the first flexible gear;

positioning a first ring gear around a portion of the first flexible gear such that radially-inward-extending teeth of the first ring gear mesh with the radially-outward-extending teeth of the first flexible gear; and positioning a second ring gear around the second flexible gear such that radially-inward-extending teeth of the second ring gear mesh with the radially-outward-extending teeth of the second flexible gear.

15. The method of claim 14, the method further comprising:

connecting the first ring gear to ground; and connecting the second ring gear to an output structure.

\* \* \* \* \*